(12) United States Patent
Barcaru et al.

(10) Patent No.: US 9,514,091 B2
(45) Date of Patent: Dec. 6, 2016

(54) LINK AGGREGATION USING DIGESTS

(71) Applicants: Constantin Barcaru, Bucharest (RO); Gheorghe Croitoru, Bucharest (RO); Andrei Pancu, Bucharest (RO); Radu Popa, Bucharest (RO)

(72) Inventors: Constantin Barcaru, Bucharest (RO); Gheorghe Croitoru, Bucharest (RO); Andrei Pancu, Bucharest (RO); Radu Popa, Bucharest (RO)

(73) Assignee: Avaya Inc., Santa Clara, CA (US)

(*) Notice: Subject to any disclaimer, the term of this patent is extended or adjusted under 35 U.S.C. 154(b) by 99 days.

(21) Appl. No.: 13/678,502

(22) Filed: Nov. 15, 2012

(65) Prior Publication Data

US 2014/0047105 A1 Feb. 13, 2014

Related U.S. Application Data

(63) Continuation-in-part of application No. 13/572,680, filed on Aug. 12, 2012, now abandoned.

(51) Int. Cl.
*H04L 29/04* (2006.01)
*G06F 15/173* (2006.01)
*H04L 12/709* (2013.01)
*H04L 12/46* (2006.01)

(52) U.S. Cl.
CPC ....... *G06F 15/17306* (2013.01); *H04L 45/245* (2013.01); *H04L 12/467* (2013.01); *Y02B 60/33* (2013.01)

(58) Field of Classification Search
CPC ............. G06F 15/17306; H04L 45/245; H04L 12/467; Y02B 60/33
See application file for complete search history.

(56) References Cited

U.S. PATENT DOCUMENTS

| | | | |
|---|---|---|---|
| 7,414,985 B1* | 8/2008 | Tedijanto et al. | 370/255 |
| 2008/0107027 A1* | 5/2008 | Allan et al. | 370/235 |
| 2009/0252170 A1* | 10/2009 | Hu | H04L 12/4675 370/395.53 |
| 2011/0075559 A1* | 3/2011 | Katsura et al. | 370/231 |
| 2012/0134266 A1* | 5/2012 | Roitshtein et al. | 370/230 |

OTHER PUBLICATIONS

Frazier, Howard, et al., IEEE 802.3ad Link Aggregation, IEEE 8023 HSSG, Apr. 17, 2007, pp. 1-13, Ottowa, Canada.
Thaler, Patricia, et. al., IEEE 802.1Q Media Access Control Bridges and Virtual Bridged Local Area Networks, IETF 86, Mar. 10, 2013, pp. 1-77.

(Continued)

*Primary Examiner* — Omar Ghowrwal

(57) ABSTRACT

Methods, systems and computer readable media for link aggregation using digests are described. In some implementations, the method can include obtaining information about each port in a group of one or more ports. The method can also include computing a digest corresponding to each port in the group of one or more ports, the digest being based on the information about the corresponding port. The method can further include determining whether each port in the group of one or more ports is suitable for aggregation in a link aggregation group by comparing the digest corresponding to each port with a digest of a port in the link aggregation group.

20 Claims, 3 Drawing Sheets

(56) References Cited

OTHER PUBLICATIONS

Fedyk, Don, Shortest Path Bridging IEEE 802.1aq Overview, IEEE Editor 802.1aq, Jul. 12, 2010, pp. 1-25.
Gosling, James, et al., The Java® Language Specification, Feb. 3, 2015, pp. 1-788.
Metro Ethernet Forum, Technical Specification MEF 11 User Network Interface (UNI) Requirements and Framework, Nov. 2004, pp. 1-33.
Baudin, Patrick, et al., ACSL: ANSI C Specification Language Preliminary design, version 1.2, Mar. 4, 2008, pp. 1-81.
Du Toit, Stefanus, Working Draft, Standard for Programming Language C++, Jan. 16, 2012, pp. 1-1324.
Microsoft Corp., C# Language Specification Version 5.0, 2012, pp. 1-527.

\* cited by examiner

LINK AGGREGATION USING DIGESTS

TECHNICAL FIELD

Embodiments relate generally to computer networks, and more particularly, to methods, systems and computer readable media for link aggregation using digests.

BACKGROUND

In order for a Link Aggregation Protocol (LACP) system to allow a number of ports to participate in the same Link Aggregation Group (LAG), various per-port settings, such as VLAN Shortest Path Bridging-MAC (SPBm) settings on the ports involved in LACP may need to be the same. Testing for similarity can mean performing a series of comparisons between all the SPBm settings, for example UNI configuration of the ports, in a very short time. Performing these comparisons using current techniques in a stackable environment with SPBm could significantly impact system performance and scalability.

Embodiments were conceived in light of the above mentioned problems and limitations, among other things.

SUMMARY

In some systems, each time a new port joins a LAG, the system has to compare its configuration to that of the ports already in the LAG, to determine if the new port is compatible with the other ports. The SPBm configuration can be a rather large string and can include hundreds of pairs of ISID-VLAN ID correspondence values. The ISID is 24 bits long, while the VLAN ID is 12 bits long. In a typical scenario with an 8-port LAG, a system would have to compare eight 48 kilobit SPBM configuration strings. Using an implementation as described herein, a system would only have to make eight 128 bit comparisons, so the operation may only take $\frac{1}{384}$ the time it would take using a conventional comparison solution.

Some implementations can include maintaining a digest of the SPBm settings for each port, and comparing the digest across ports, to determine whether the ports have the same configuration, which would allow them to aggregate. In cases where the ports do not have same digest then the system will not permit them to aggregate. A digest is created at startup for each port in the system, and every time the configuration of the port is changed the digest is updated.

Some implementations can include comparing 16-byte digest strings, instead of comparing entire thousand-byte configuration strings, for example. Also, some implementations can include determining the consistency of an SPBm configuration by comparing pre-computed digest values corresponding to each port, rather than by comparing the entire configuration strings corresponding to each port.

Some implementations can include a method for utilizing link aggregation in a shortest path bridging network. The method can include obtaining, using one or more computing devices, information about each port in a group of one or more ports. The method can also include computing, using the one or more computing devices, a digest corresponding to each port in the group of one or more ports, the digest being based on the information about the corresponding port. The method can further include determining, using the one or more computing devices, whether each port in the group of one or more ports is suitable for aggregation in a link aggregation group by comparing the digest corresponding to each port with a digest of a port in the link aggregation group.

The method can also include aggregating each suitable port in the group of one or more ports with the link aggregation group. The aggregating can occur according to a protocol, such as a link aggregation control protocol.

The information about each port can include an ISID and a VLAN identification. The digest can include a value based on one or more of an ISID and a VLAN identification. The digest can also include a UNI configuration digest.

Obtaining information about a port can be performed during startup of the one or more computing devices and can be subsequently performed for a port when configuration of that port changes.

Some implementations can include a system comprising one or more processors configured to perform operations. The operations can include obtaining information about each port in a group of one or more ports. The operations can also include computing a digest corresponding to each port in the group of one or more ports, the digest being based on the information about the corresponding port. The operations can further include determining whether each port in the group of one or more ports is suitable for aggregation in a link aggregation group by comparing the digest corresponding to each port with a digest of a port in the link aggregation group.

The operations can also include aggregating each suitable port in the group of one or more ports with the link aggregation group. The aggregating can occur according to a protocol, such as a link aggregation control protocol.

The information about each port can include an ISID and a VLAN identification. The digest can include a value based on one or more of an ISID and a VLAN identification.

Some implementations can include a nontransitory computer readable medium having stored thereon software instructions that, when executed by a processor, cause the processor to perform operations. The operations can include obtaining information about each port in a group of one or more ports. The operations can also include computing a digest corresponding to each port in the group of one or more ports, the digest being based on the information about the corresponding port. The operations can further include determining whether each port in the group of one or more ports is suitable for aggregation in a link aggregation group by comparing the digest corresponding to each port with a digest of a port in the link aggregation group. The operations can also include aggregating each suitable port in the group of one or more ports with the link aggregation group.

The information can include an ISID and a VLAN identification. The digest can include a value based on one or more of an ISID and a VLAN identification. The digest can include a UNI configuration digest.

Obtaining the information about each port can be performed during startup of the one or more computing devices and can be subsequently performed for a port when configuration of that port changes. The aggregating can occur according to a protocol.

DETAILED DESCRIPTION

Figure 1:
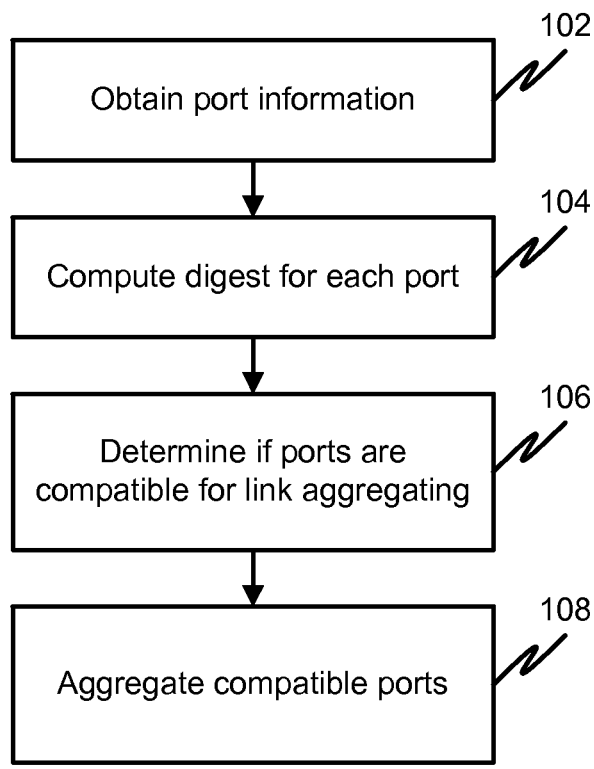
FIG. 1 is a flow chart showing an example method of generating port digests in accordance with at least one implementation.

FIG. 1 is a flow chart showing an example method 100 of generating port digests. Processing begins at 102, where information is obtained about each port. For example, in an SPBm network, the information could include ISID and corresponding VLAN identification value pairs. Other port configuration information can be obtained. Processing continues to 104.

At 104, a digest is computed for each port based on the information obtained at 102. The digest can include a value computed based on the information corresponding to each port. In general the digest can represent a compressed or short hand value computed based on the port information that would change if the port information were to change. For example, the digest could include a hash function of the ISID value and VLAN identification. Any other suitable computation techniques can be used to compute the digest (e.g., one or more of the techniques used to compute authentication digests). Processing continues to 106.

At 106, a system can determine if one or more ports are suitable (or compatible) for link aggregation with each other or with another link aggregation group by comparing the digest values of the ports. If the digest values are the same, then the ports may be compatible for link aggregation. If the digest values are not the same, then the ports may not be suitable for link aggregation. Processing continues to 108.

At 108, compatible ports (as determined at 106) can be aggregated with each other (or with another link aggregation group). It will be appreciated that 102-108 can be repeated in whole or in part in order to accomplish a contemplated link aggregation task using digests.

Figure 2:
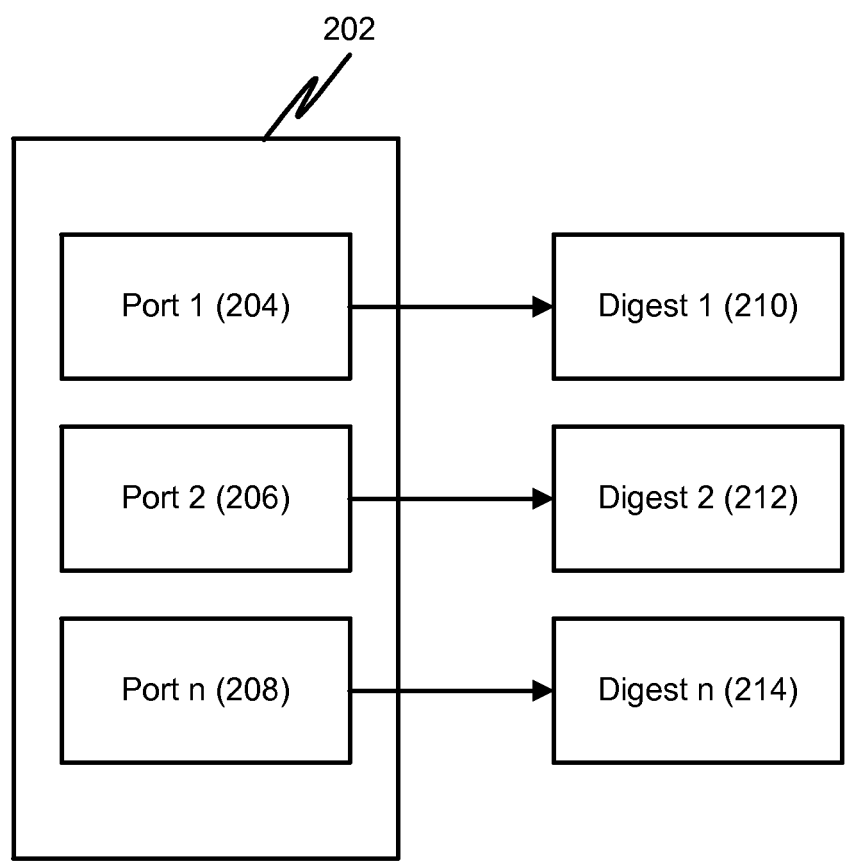
FIG. 2 is an example network with LACP using digests in accordance with at least one implementation.

FIG. 2 is an example network with LACP using digests in accordance with at least one embodiment. One or more embodiments can include adding LACP (Link Aggregation Control Protocol) support to SPBm by using UNI configuration digests. A LAG (202) is desired that includes a plurality of ports (204-208). A digest (210-214) is generated for each of the ports. The digests (210-214) can be used to determine if a port is suitable for aggregating.

In some conventional systems, each time a new port joins a LAG, the system has to compare its configuration to that of the ports already in the LAG, to determine if the new port is compatible with the other ports. The SPBm configuration can be a rather large string and can consist of hundreds of pairs of ISID-VLAN identification values. The ISID is 24 bits long, while the VLAN identification is 12 bits long. In a typical scenario with an 8-port LAG, a system would have to compare eight 48 kilobit SPBm configuration strings.

In some implementations of a system as described herein, the system would only have to make eight 128 bit comparisons, so the operation may only take $\frac{1}{384}$ the time it would take using a convention comparison solution.

Some implementations can include maintaining a digest of the SPBm settings for each port, and comparing the digest across ports, to determine whether the ports have the same configuration, which would allow them to aggregate. In cases where the ports do not have the same digest, the system may not permit them to aggregate. The ports digests can be compared to each other or to one or more ports already in a link aggregation group.

A digest can be created at startup for each port in the system, and updated when the configuration of the port is changed the digest is updated. Some implementations can include comparing 16-byte digest strings, instead of comparing entire thousand-byte configuration strings, for example. Also, some implementations can include determining the consistency of SPBm configuration by comparing corresponding pre-computed digests, rather than by comparing the entire configuration strings for the SPBm ports.

Figure 3:
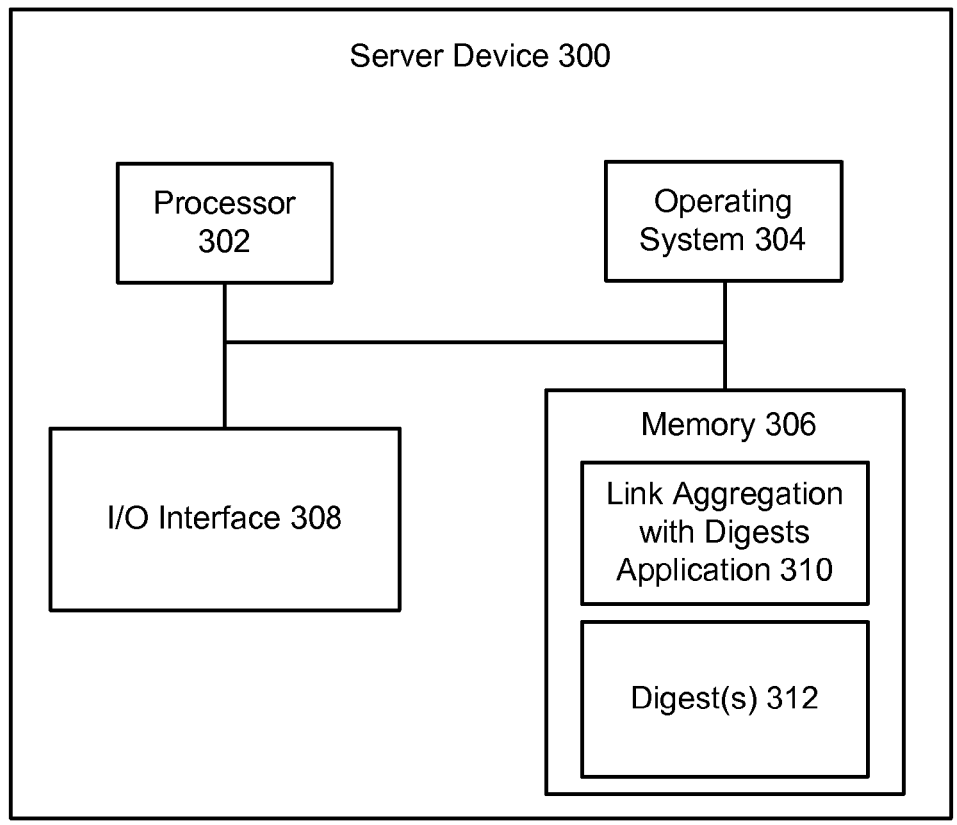
FIG. 3 is an example computer for link aggregation using port digests in accordance with at least one implementation.

FIG. 3 is a diagram of an example computer 300 that can be used for link aggregation using digests in accordance with some implementations. The computer 300 includes a processor 302, operating system 304, memory 306 and I/O interface 308. The memory 306 can include a link aggregation using digests application 310 and one or more digests 312.

In operation, the processor 302 may execute the link aggregation using digests application 310 stored in the memory 306. The link aggregation using digests application 310 can include software instructions that, when executed by the processor, cause the processor to perform operations for link aggregation using digests (e.g., the link aggregation using digests application 310 can perform one or more of steps 102-108 described above and, in conjunction, can access the digest(s) 312). The link aggregation using digests application 310 can also operate in conjunction with the operating system 304.

Notifications can be used among members (or users) of a social network. For example, notifications corresponding to the messages sent between a first social network member and one or more other members in the social graph of the first social network member (or to users outside of the social network) can be synchronized.

A switch or bridge (e.g., 300) can include, but is not limited to, a single processor system, a multi-processor system (co-located or distributed), a cloud computing system, or a combination of the above.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for link aggregation using digests.

While the disclosed subject matter has been described in conjunction with a number of embodiments, it is evident that many alternatives, modifications and variations would be, or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method for utilizing link aggregation in a shortest path bridging network, the method comprising:
    obtaining, using one or more processors, one or more port configuration strings representing port settings of one or more corresponding ports;
    computing, using the one or more processors, a digest of port settings for each of the one or more corresponding ports, wherein each digest includes 16 bytes and each of the port configuration strings has a number of bits greater than a number of bits in the digest; and
    determining, using the one or more processors, whether one of the ports is suitable for aggregation in a link aggregation group by comparing the digest corresponding to the one port with a digest of another port in the link aggregation group.

2. The method of claim 1, further comprising aggregating the port with the link aggregation group based on the determining.

3. The method of claim 2, wherein the aggregating occurs according to a protocol.

4. The method of claim 3, wherein the protocol is a link aggregation control protocol.

5. The method of claim 1, wherein the configuration information includes an ISID and a VLAN identification.

6. The method of claim 1, wherein the digest includes a value based on one or more of an ISID and a VLAN identification.

7. The method of claim 1, wherein the digest includes a UNI configuration digest.

8. The method of claim 1, wherein the obtaining is performed during startup of the one or more computing devices and is subsequently performed for a port when configuration of that port changes.

9. A system comprising:
    one or more hardware processors;
    a nontransitory computer readable medium coupled to the one or more hardware processors and having stored thereon instructions that, when executed by the one or more hardware processors, cause the one or more hardware processors to perform operations including:
    obtaining one or more port configuration strings representing port settings of one or more corresponding ports;
    computing a digest of port settings for each of the one or more corresponding ports, wherein each digest includes 16 bytes and each of the port configuration strings has a number of bits greater than a number of bits in the digest; and
    determining whether one of the ports port is suitable for aggregation in a link aggregation group by comparing the digest of the one port with a digest of another port in the link aggregation group.

10. The system of claim 9, wherein the operations further include aggregating the port with the link aggregation group based on the determining.

11. The system of claim 10, wherein the aggregating occurs according to a protocol.

12. The system of claim 11, wherein the protocol is a link aggregation control protocol.

13. The system of claim 9, wherein the information includes an ISID and a VLAN identification.

14. The system of claim 9, wherein the digest includes a value based on one or more of an ISID and a VLAN identification.

15. A nontransitory computer readable medium having stored thereon software instructions that, when executed by a processor, cause the processor to perform operations including:
- obtaining one or more port configuration strings representing port settings of one or more corresponding ports;
- computing a digest of port settings for each of the one or more corresponding ports, wherein each digest includes 16 bytes and each of the port configuration strings has a number of bits greater than a number of bits in the digest;
- determining whether one of the ports port is suitable for aggregation in a link aggregation group by comparing the digest of the one port with a digest of another port in the link aggregation group; and
- aggregating the one port with the link aggregation group based on the determining.

16. The nontransitory computer readable medium of claim 15, wherein the configuration information includes an ISID and a VLAN identification.

17. The nontransitory computer readable medium of claim 15, wherein the digest includes a value based on one or more of an ISID and a VLAN identification.

18. The nontransitory computer readable medium of claim 15, wherein the digest includes a UNI configuration digest.

19. The nontransitory computer readable medium of claim 15, wherein the obtaining is performed during startup of the one or more computing devices and is subsequently performed for a port when configuration of that port changes.

20. The nontransitory computer readable medium of claim 15, wherein the aggregating occurs according to a protocol.

* * * * *